United States Patent
Liu et al.

(10) Patent No.: US 7,450,251 B2
(45) Date of Patent: Nov. 11, 2008

(54) FANNED LASER BEAM METROLOGY SYSTEM

(75) Inventors: Ketao Liu, Cerritos, CA (US); Peter J. Sedivec, Manhattan Beach, CA (US); Douglas Bender, Redondo Beach, CA (US); Gregory S. Becker, Redondo Beach, CA (US); John Y. Liu, San Marino, CA (US); Richard W. Guthrie, Moorpark, CA (US); Mark A. Lundgren, Fullerton, CA (US)

(73) Assignee: The Boeing Company, Chicago, IL (US)

( * ) Notice: Subject to any disclaimer, the term of this patent is extended or adjusted under 35 U.S.C. 154(b) by 189 days.

(21) Appl. No.: 11/270,000

(22) Filed: Nov. 9, 2005

(65) Prior Publication Data

US 2007/0103698 A1    May 10, 2007

(51) Int. Cl.
*G01C 1/03* (2006.01)
*G01B 11/26* (2006.01)

(52) U.S. Cl. .............. 356/625; 356/3.09; 356/614; 356/620; 356/141.1

(58) Field of Classification Search .......... 356/614, 356/620, 621, 622, 375, 4.01, 5.01, 3.09
See application file for complete search history.

(56) References Cited

U.S. PATENT DOCUMENTS 4,926,050 A * 5/1990 Shemwell ........... 250/559.38
5,000,564 A * 3/1991 Ake .................. 356/3.16
5,046,851 A * 9/1991 Morgan ................ 356/615
5,100,229 A * 3/1992 Lundberg et al. ....... 356/3.12
5,243,398 A   9/1993 Nielson
5,742,394 A * 4/1998 Hansen ................ 356/620

(Continued)

FOREIGN PATENT DOCUMENTS

EP    1524497 A1    4/2005

OTHER PUBLICATIONS

Tsumura, T.; Okubo, H.; Komatsu, N. "A Method of Position and Attitude MEasurement of Vehicle Using Fan Shaped Laser Beam and Corner Cube", Vehicle Navigation and Information Systems Conference, 1993., Proceedings of the IEEE-IEE, vol., Iss., Oct. 12-15, 1993, pp. 517-520.*
Charles F. Bergh, "A Compact, Low Power Two-Axis Scanning Laser Rangefinder For Mobile Robots", Jet Propulsion Lab., Pasadena, CA (pp. 1-6).
Joshua A. Strickon, "Design and HCI Applications of a Low-Cost Scanning Laser Rangefinder", Massachusetts Institute of Technology, Jun. 1999 (pp. 1-140).
UK IPO Search Report, Jul. 26, 2007, Boeing.

*Primary Examiner*—L. G. Lauchman
*Assistant Examiner*—Rebecca C Slomski
(74) *Attorney, Agent, or Firm*—Jonathan W. Hallman; MacPherson Kwok Chen & Heid LLP

(57) ABSTRACT

Systems and techniques for laser metrology. A system may include a laser source and a fanning apparatus configured to generate a fanned laser beam. The fanned laser beam may be scanned across the surface of an object, and may reflect off a plurality of targets positioned on the surface. A position detection module may determine a position of the metrology targets based on the reflected beam.

18 Claims, 3 Drawing Sheets

U.S. PATENT DOCUMENTS

| | | | |
|---|---|---|---|
| 5,812,267 A * | 9/1998 | Everett et al. | 356/614 |
| 6,545,751 B2 * | 4/2003 | Beliveau et al. | 356/141.4 |
| 6,646,723 B1 | 11/2003 | Dubovitsky et al. | |
| 6,778,284 B2 * | 8/2004 | Casagrande | 356/614 |
| 7,110,092 B2 * | 9/2006 | Kasper et al. | 356/4.01 |
| 2004/0032596 A1 * | 2/2004 | Lange et al. | 356/622 |
| 2005/0235504 A1 | 10/2005 | Barvosa-Carter et al. | |
| 2006/0187470 A1 * | 8/2006 | Massey et al. | 356/614 |

* cited by examiner

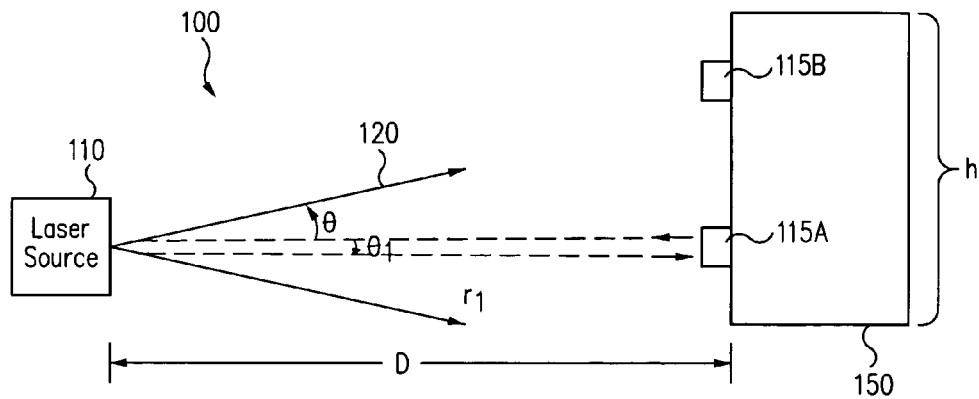
FIG. 1A
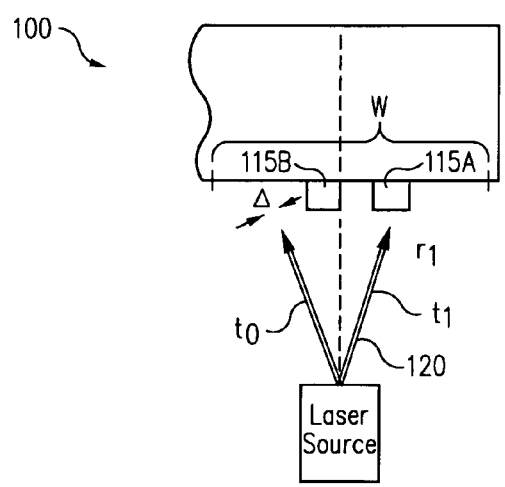
FIG. 1B
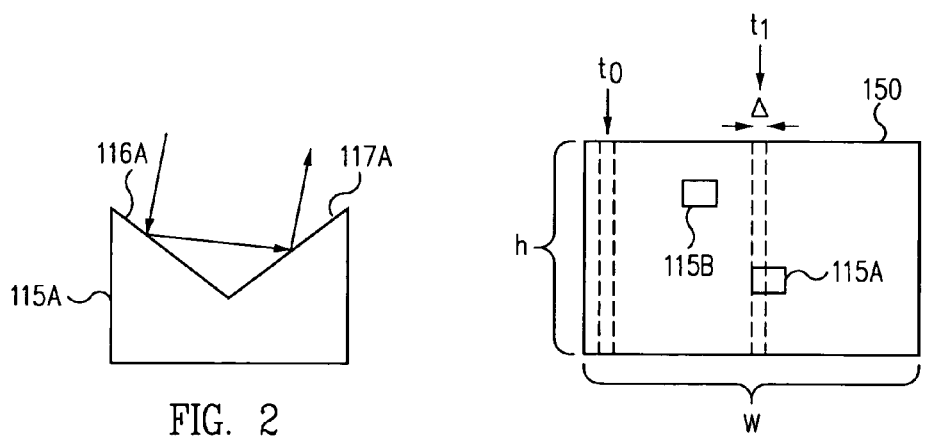
FIG. 2
FIG. 1C

FANNED LASER BEAM METROLOGY SYSTEM

BACKGROUND

1. Field of Invention

This invention generally relates to metrology, particularly to optical metrology.

2. Related Art

Metrology techniques are used to measure distances; for example, to precisely determine surface profiles.

One metrology application is the measurement of space structures, which may be referred to as space metrology. Many systems deployed in space require highly accurate pointing and/or precise knowledge of a payload surface profile. Some examples of such systems include current communication satellite payloads, space-based radar apparatus, and optical payloads.

Existing metrology techniques may not be satisfactory for some applications. For example, some existing space metrology techniques use cameras to monitor targets arrayed on a surface of interest. However, in order to achieve high angular accuracy, the field of view of each of the cameras is small. In order to monitor all relevant targets with a particular accuracy, a large number of cameras may be needed. This increases the complexity of the system, while decreasing its reliability.

Some other space metrology techniques use active targets; that is, devices positioned on the surface of the structure that require power to perform one or more functions in response to received light. Some examples of active targets are targets that include photodiodes or lasers. Metrology systems using active targets may be advantageous in some circumstances, since light need not travel round-trip (as it does for passive targets), and since the system can electronically determine and/or control which target is being measured at a particular time. However, active targets increase the complexity of the system (e.g., because of the necessary cabling), and so may be more expensive and less reliable than passive targets. Active targets also increase the overall system weight, and may be difficult to package into a deployable structure.

Other existing metrology techniques use laser trackers and/or scanning lidar (light detection and ranging). These systems scan a collimated laser beam over a large field of view. The two-dimensional scan may be complex, and it may be difficult to scan the targets in a time sufficient to meet overall system metrology bandwidth requirements.

Other metrology techniques use multiple scanning fanned laser beams with active targets (such as photodiodes). The active targets generate signals in response to receiving light from the multiple scanning fanned laser beams. The signals from the targets are then processed, and the target position determined using triangulation.

Techniques using multiple scanning fanned laser beams may be impractically complex and slow, for some applications. Further, active targets may be less reliable and more complex than passive targets.

SUMMARY

In general, in one aspect a metrology system comprises a laser source and a fanning apparatus to receive light from the laser source and to generate a fanned transmitted beam. The transmitted beam may be reflected off at least one metrology target positioned on a first surface of an object. The system may further include a position detection module configured to receive the reflected beam and to determine a position of the at least one metrology target based on the reflected beam. The system may further comprise a scanner to generate relative motion between the fanned transmitted beam and the first surface.

The fanning apparatus may be implemented in a number of ways. For example, the fanning apparatus may comprise at least one of a lens (such as a cylindrical lens) and a holographic grating. The position detection module may comprise a position sensitive sensor to receive the reflected beam and to generate information indicative of an elevation angle for the at least one metrology target.

The scanner may comprise a scanning mirror. The scanner may generate information indicative of an azimuthal angle, and the position detection module may be configured to receive the information indicative of the azimuthal angle.

The system may further comprise a ranging module configured to receive information indicative of the reflected beam and information indicative of the transmitted beam and to generate information indicative of a range of the at least one metrology target.

In general, in another aspect, a method of determining a plurality of positions on a surface comprises generating a substantially two-dimensional probe beam extending in a first direction. The method may further comprise scanning the probe beam across the surface in a second direction different than the first direction. The method may further comprise receiving a return beam reflected from a first target at a first position of the plurality of positions. The method may further comprise determining the first position based at least on receiving the return beam.

Scanning the probe beam may comprise scanning the probe beam with a scanner, and determining the first position based at least on receiving the return beam may comprise determining an azimuth angle of the first position based on a position of the scanner. Determining the first position based at least on receiving the return beam may comprise determining an elevation angle of the first position based on a detected position of the return beam on a sensor, which may be a substantially one-dimensional sensor.

Determining the first position based at least on receiving the return beam may comprise determining a range of the first position. The range may be determined by determining a time between a beam generation pulse and receiving the return beam. The range may be determined by determining a phase relationship between the probe beam and the return beam.

In general, in another aspect, a metrology system may comprise a light source module configured to generate a substantially two dimensional probe beam extending in a first direction. The system may further comprise a scanner configured to scan the probe beam across a surface in a second direction different than the first direction, the surface including a plurality of reflective targets including a first target.

The system may further comprise a substantially one dimensional sensor positioned and configured to receive return beams from the plurality of reflective targets, wherein the sensor is configured to generate information indicative of a receiving position of each of the received return beams. The system may further comprise a position detection module configured to determine a position of the first target in response to receiving a first return beam from the first target on the sensor at a first receiving position of the first return beam.

These and other features and advantages of the present invention will be more readily apparent from the detailed description of the exemplary implementations set forth below taken in conjunction with the accompanying drawings.

BRIEF DESCRIPTION OF THE DRAWINGS

FIG. 1A is a schematic side view of a metrology system, according to some embodiments;

FIG. 1B is a schematic top view of the metrology system shown in FIG. 1A, according to some embodiments;

FIG. 1C is a view of an object surface, according to some embodiments;

FIG. 2 is a cross-sectional view of a retro-reflective target that may be positioned on an object surface such as the surface shown in FIG. 1C;

Like reference symbols in the various drawings indicate like elements.

DETAILED DESCRIPTION

Figure 3:
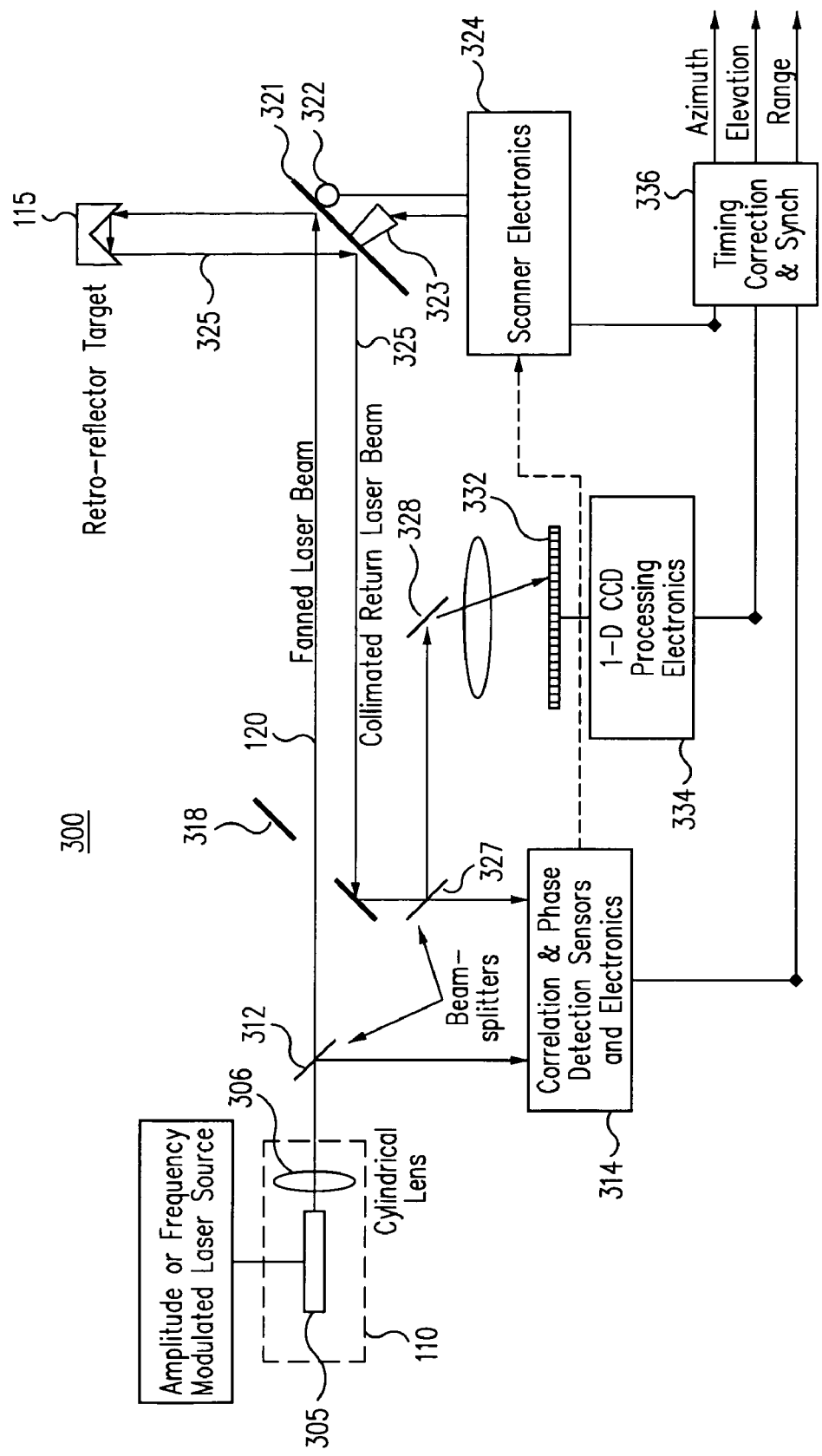
FIG. 3 is schematic top view of a metrology system, according to some embodiments.

Systems and techniques described herein may provide for precise metrology without the cost, complexity, and weight encountered with some available metrology techniques. The systems and techniques may be particularly beneficial for space metrology applications.

In space metrology, a number of characteristics may be important. For example, measurement accuracy requirements may be stringent, so that position information (e.g., surface deformation information) is known to within an allowable margin. In some applications, measurement accuracy requirements may be on the order of a millimeter or less. Further, the scanning rate for obtaining location information should be less than a particular bandwidth (where the term "bandwidth" herein refers to the frequency with which position data may be obtained for all relevant targets, and is generally selected to provide information for particular dynamic modes of the surface). Additionally, the metrology system should be lightweight, reliable, and relatively simple.

The systems and techniques provided herein use a substantially two-dimensional probe light such as a fanned laser beam that is moved relative to a surface of an object. The two-dimensional probe beam extends in a first direction (e.g., vertically), and is scanned across the surface in a second different direction (e.g., horizontally). The surface has a plurality of reflective targets positioned either regularly or irregularly thereon.

The relative motion of the probe light and the surface enables a narrow slice of the surface to be sampled at any particular time. If at least a portion of a target is illuminated by the fanned probe beam, a return beam is generated. The return beam is detected, and used to determine the position of the associated target(s).

The position is defined with respect to a particular reference system, using three parameters. For example, the three parameters may be a range (distance from an origin of the reference system), azimuthal angle (angle with respect to a first reference line in a first reference plane), and elevation angle (angle with respect to a different reference line in a different reference plane). Other coordinate systems may be used as well; for example, Cartesian coordinate systems, cylindrical coordinate systems, etc.

FIGS. 1A to 1C illustrate different aspects of a metrology system 100, according to some embodiments.

FIG. 1A shows a side view of a metrology system 100 at a time $t_1$ when a fanned laser beam 120 is incident on a first target 115A. FIG. 1B shows a top view of system 100, illustrating the position of the fanned laser beam 120 at an initial time $t_0$, as well as at time $t_1$, according to some embodiments. FIG. 1C shows a view of a surface of object 150, showing the incident beam at $t_0$ and $t_1$.

System 100 may be used to determine a position of a plurality of targets 115 such as targets 115A and 115B on a surface of object 150. By accurately determining the positions of targets 115, surface profile information for object 150 may be obtained. As shown in FIGS. 1A and 1C, the area of interest on the surface of object 150 has a height h and a width w, which may encompass a portion of the surface of object 150 (either the entire facing surface or less than the entire surface).

Targets 115A and 115B may comprise passive retro-reflective targets positioned on object 150 to provide needed surface profile information. A retro-reflective target produces a reflected beam that is substantially parallel to the portion of the incident beam illuminating the target.

Referring again to FIGS. 1A, 1E, and 1C, system 100 may operate as follows. A light source 110 may generate substantially two-dimensional probe beam such as fanned laser beam 120. Beam 120 has an angular half width of $\Theta$ with respect to a first angular range and a beam width of $\Delta$ at the surface. If the surface is a distance D from light source 110, the incident light illuminates an area equal to $2D\Delta\tan\Theta$ at any particular time. Fanned beam 120 may be scanned in an azimuthal angle $\Phi$ with respect to a second angular range so that the entire area of interest corresponding to the width w is illuminated. Different scanning mechanisms may be used to scan fanned beam 120 relative to the area of interest. For example, a scanning mechanism may include a rotating prism, a driven (e.g., flexure-mounted) mirror, or other mechanism.

At $t_1$, beam 120 illuminates a portion of target 115A, which reflects a return beam toward a detector. The position of target 115A (with respect to a particular reference system) may be determined using one or more return beam parameters (e.g., parameters indicative of return beam position, timing, phase, etc.), as well as other system parameters (e.g., parameters indicative of scanner position, pulse generation time, reference signal phase, modulation signal, etc.) Note that as beam 120 scans across target 115A, a return beam is generated, and the return beam signal is detected over a small time interval rather than as an instantaneous pulse. Therefore, in some embodiments, location information is determined by integrating the return signal and identifying a centroid of the return signal. Examples of position determination techniques are discussed more fully below.

System 100 may be configured for a particular metrology application. For example, the value of $\Theta$ may be selected based on the size (e.g., height) of the surface area of interest and the expected separation between light source 110 and the surface. In some embodiments (e.g., embodiments in which surfaces are relatively far to source 110), $\Theta$ may be between about 1 degree and about 8 degrees, while in others (e.g., embodiments in which surfaces are relatively close to source 110), larger angles may be used. The beam width $\Delta$ may be selected for the particular application. For example, a width $\Delta$ of beam 120 may be about 6-10 mm, so that return signals from adjacent targets are clearly distinguishable (although of course larger or smaller values may be used).

The scanning frequency may also be selected for a particular application. In general, the scanning frequency should be high enough so that the desired measurement bandwidth is obtained. The desired bandwidth is typically a function of the highest dynamic mode that the metrology system is intended to capture.

Target size, positioning, and configuration may be selected based on the application and desired information. In some embodiments, the target width may be between about 6 mm and about 25 mm, although many different values may be used. In some embodiments, object 150 may have a regular array of targets on one or more exterior surfaces of interest. In other embodiments, targets may be placed on a surface of object 150 in a different manner; for example, with a higher target density near objects of interest.

As noted above, targets 115 may be retro-reflective targets. FIG. 2 shows a two-dimensional representation of an example of a retro-reflective target 115 that may be used. For the example shown, an incident beam is reflected from a first surface 116A to a second surface 117A, and then reflected from second surface 117A back toward the light source on a path that is substantially parallel to the path of the incoming light. The reflected light may then be received in a detector (not shown in FIGS. 1A to 1C). In practice, a three-dimensional retro-reflective target includes a third parallel mirror, and light may be reflected from all three internal faces of the cube before exiting substantially parallel to the incident light.

FIG. 3 shows a schematic top view of a metrology system 300, according to some embodiments. In system 300, light source 110 includes a laser source 305, which may be an amplitude or frequency modulated laser source. Light source 110 further include a fanning apparatus such as a cylindrical lens 306 to generated fanned laser beam 120 from a pencil beam generated by laser source 305. In some embodiments, the fanning apparatus may include a holographic film (grating), and/or other mechanism.

Fanned laser beam 120 is split by a first beam splitter 312. A first portion of beam 120 is directed to a correlation and phase detection sensor and electronics module 314, to be used in position determination for one or more targets 115. A second portion of beam 120 passes through an aperture in a mirror 318 and is then incident on a scanning mirror 321. Scanning mirror 321 is driven using a mirror driver 323, so that beam 120 is scanned across a surface including targets 115. An angular position of scanning mirror 321 is detected using an angular measurement sensor 322 (e.g., an optical encoder). Scanner electronics 324 is in communication with sensor 322 and mirror driver 323.

When scanning mirror 321 is positioned so that beam 120 is incident on target 115, beam 120 may be reflected as a return beam 325. Return beam 325 is reflected by scanning mirror 321 and then by mirror 318. After being reflected by mirror 318, return beam 325 is split into a first portion and a second portion through a beam splitter 327.

The first portion of return beam 325 is incident on a mirror 328, and then on a sensor 332. Sensor 332 may be a substantially linear sensor such as a one-dimensional charge coupled device (CCD) sensor or position sensitive detector (PSD) sensor. A return beam corresponding to a particular target will be incident on sensor 332 at a location indicative of the elevation angle for that particular target.

In response to detecting the return beam, sensor 332 generates a signal indicative of the position on sensor 332 corresponding to the received return beam 325. An output of sensor 332 including information indicative of the position on sensor 332 is transmitted to processing electronics 334, which may comprise one-dimensional CCD processing electronics.

The second portion of return beam 325 is provided to module 314 to be used with beam 120 to determine a range of each detected target 115.

As noted above, the associated positions of targets 115 may be determined by determining a range, azimuth angle, and elevation angle. For example, using system 300, an output of module 314 may be provided to a timing correction and synchronization module 336 to generate a range, an output from processing electronics 334 may be provided to module 336 to determine an elevation angle, and an output from scanner electronics 324 may be provided to module 336 to determine an azimuth angle.

The range may be determined as follows. As noted above, beam 120 may be an amplitude or frequency modulated beam. A first portion of beam 120 is directed to module 314. When beam 120 is incident on a target 315 at a particular range $R_1$, a portion of return beam 325 is also directed to module 314. At module 314, information indicative of beam 120 and information indicative of return beam 325 are combined to determine a phase relationship between beam 120 and return beam 325. The range can be determined from the phase relationship. Note that for amplitude modulation there is an ambiguity in the range measurement, stemming from the fact that the phase relationship will be the same for ranges that are separated by one modulation wavelength (e.g., one meter for a 150 MHz modulation frequency). Similarly, for frequency modulation there is an ambiguity dependent on how quickly you are cycling through the frequencies (the chirp rate). Therefore, some knowledge of the range is needed to use an amplitude or frequency modulation ranging technique.

Another option, not shown in FIG. 3, is to mix information indicative of return beam 325 with information indicative of the signal used to modulate the laser. With this option, a phase relationship and associated range may be determined without the need to split beam 120 (and thus reduce the light intensity incident on targets 115).

A third option (also not shown in FIG. 3) is to use a time of flight technique to determine the range. Rather than providing a continuous beam 120, laser pulses are provided. A return signal is only received when a pulse is incident on one of the targets 115. A time between pulse generation and the associated return signal is determined and multiplied by the speed of light to determine the range.

Using currently available components, the time of flight technique may be less accurate than amplitude and/or frequency modulation techniques. However, the time of flight technique may have some advantages over modulation techniques. For example, when the time between pulses is more than the maximum round trip travel time (as determined by the position of the furthest target), there is no ambiguity in the range. Additionally, the time of flight technique may provide position information for multiple targets illuminated at substantially the same time by beam 120, as discussed further below.

Figure 4A:
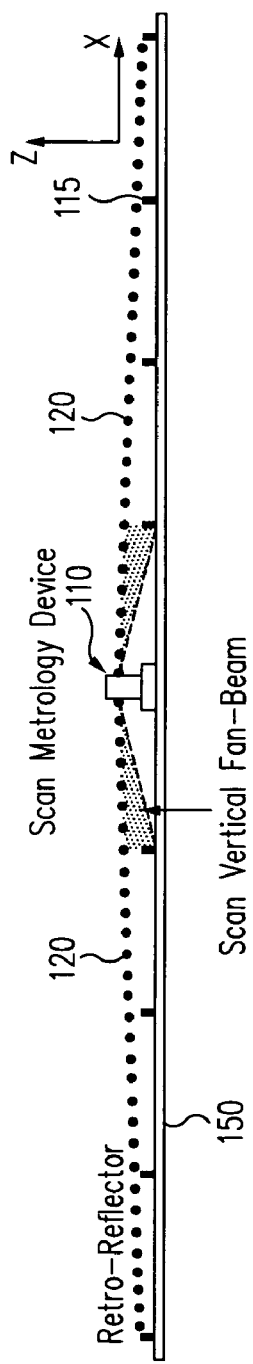
FIGS. 4A and 4B illustrate an application of a metrology system, according to some embodiments.
Figure 4B:
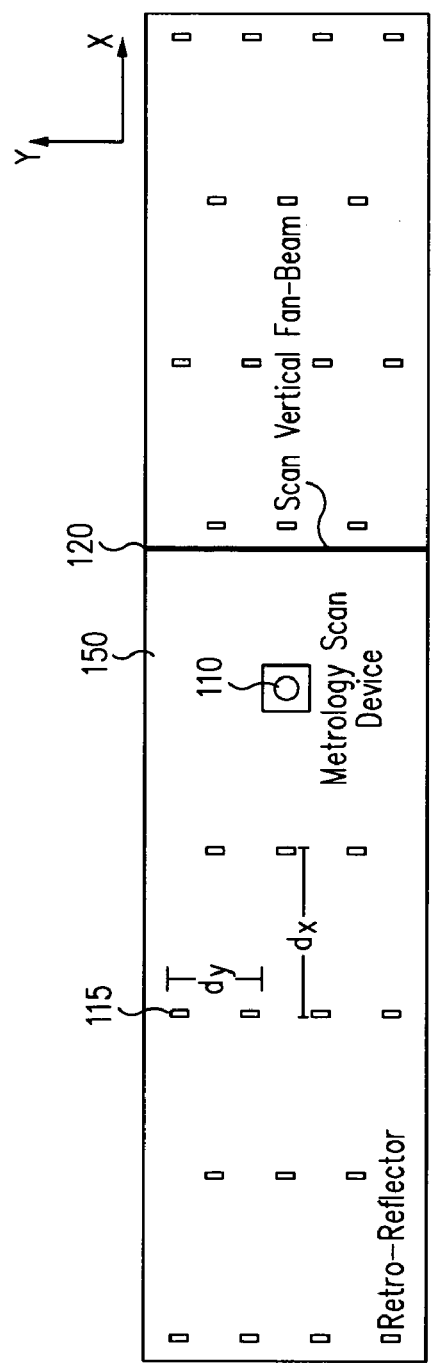

A metrology system such as system 100 of FIGS. 1A to 1C and system 300 of FIG. 3 may be used in a number of applications. FIGS. 4A and 4B show side and top views (respectively) of a configuration that may be used to determine flatness of a surface using a plurality of targets 115 deployed over the object surface.

For the example illustrated in FIGS. 4A and 4B, targets 115 are separated by a distance $d_y$ in the y direction that is less than a separation distance $d_x$ in the x direction. Such a target configuration may be desired if, for example, more information is needed about deformation in the y direction or if a manufacturing process for object 150 is more likely to produce variations in the y direction.

As illustrated in the example of FIGS. 4A and 4B, in some situations more than one target may be illuminated at the same time. In such a situation, multiple return beams may be generated. For multiple returns, the azimuth angle and elevation angles may be determined as described above. However, if the amplitude and/or frequency modulation technique is used to determine the range, multiple ranges may not be measured without using a more complicated detector to separate (and then separately analyze) multiple return signals. In contrast, a time of flight system may be used determine multiple ranges for multiple return signals, as long as the temporal separation between consecutive return signals is greater than the minimum detectable temporal separation for the system.

In implementations, the above described techniques and their variations may be implemented at least partially as computer software instructions. Such instructions may be stored on one or more machine-readable storage media or devices and are executed by, e.g., one or more computer processors, or cause the machine, to perform the described functions and operations. For example, at least some of the functionality of module 314, processing electronics 334, scanner electronics 324, and module 336 may be provided at least partially using software.

A number of implementations have been described. Although only a few implementations have been disclosed in detail above, other modifications are possible, and this disclosure is intended to cover all such modifications, and most particularly, any modification which might be predictable to a person having ordinary skill in the art. For example, although system functionality is shown as being performed by different modules, the implementation may be different. For example, separate modules may be used, or at least some functionality described as being performed by different modules may be provided by a single hardware and/or software module.

Also, only those claims which use the words "means for" are intended to be interpreted under 35 USC 112, sixth paragraph. Moreover, no limitations from the specification are intended to be read into any claims, unless those limitations are expressly included in the claims. Accordingly, other embodiments are within the scope of the following claims.

What is claimed is:

1. A metrology system comprising:
   a laser source;
   a fanning apparatus to receive light from the laser source and to generate a fanned transmitted beam, the beam being fanned across a first angular range;
   a scanner configured to scan the fanned transmitted beam through an second angular range so as to generate a scanned fanned transmitted beam, wherein at least one metrology target is positioned on a first surface of an object within the first and second angular ranges so as to form a reflected beam; and
   a position detection module configured to receive the reflected beam and to determine, with respect to a reference point, a range to the at least one metrology target, a first angle within the first angular range for the at least one metrology target, and a second angle within the second angular range for the at least one metrology target, the position detection module using the range, the first angle, and the second angle to determine a position of the at least one metrology target based on the reflected beam.

2. The metrology system of claim 1, wherein the fanning apparatus comprises at least one of a lens and a holographic grating.

3. The metrology system of claim 2, wherein the fanning apparatus comprises a cylindrical lens.

4. The metrology system of claim 1, wherein the first angular range is an elevation angular range, the first angle thereby being an elevation angle, and wherein the position detection module includes a substantially linear sensor to determine the elevation angle.

5. The metrology system of claim 4, wherein the substantially linear sensor is a one-dimensional charge coupled device (CCD).

6. The metrology system of claim 4, wherein the substantially linear sensor is a one-dimensional position sensing detector (PSD).

7. The metrology system of claim 1, wherein the second angular range is an azimuth angular range, the second angle thereby being an azimuth angle, and wherein scanner includes an angular measurement sensor to sense the azimuth angle.

8. A method of determining a plurality of positions on a surface, comprising:
   generating a laser beam fanned through a first angular range to provide a fanned laser beam;
   scanning the fanned laser beam through a second angular range so as to scan the fanned laser beam across the surface;
   sensing a first angle within the first angular range through receipt of a return beam reflected from a first target at a first position of the plurality of positions;
   sensing a second angle within the second angular range through the receipt of the return beam;
   determining a range of the first target through the receipt of the return beam; and
   determining the first position based on the range, the first angle, and the second angle.

9. The method of claim 8, wherein the second angular range is an azimuth angular range, the second angle thereby being an azimuth angle.

10. The method of claim 8, wherein the first angular range is an elevation angular range, the first angle thereby being an elevation angle, and wherein the sensing of the elevation angle is determined through a substantially one-dimensional sensor.

11. The method of claim 8, wherein determining the range of the first position comprises determining a time between a beam generation pulse and receiving the return beam.

12. The method of claim 8, wherein determining the range of the first position comprises determining a phase relationship between the probe beam and the return beam.

13. A metrology system comprising:
   a light source module configured to generate a substantially two dimensional probe beam, the probe beam extending in a first direction and fanning across a first angular range;
   a scanner configured to scan the probe beam through a second angular range to scan across a surface in a second direction different than the first direction, the surface including a plurality of reflective targets;
   a substantially one dimensional sensor positioned and configured to receive return beams from the plurality of reflective targets, and wherein the one dimensional sensor is configured to sense first angles within the first angular range to the reflective targets;
   a sensor configured to sense second angles within the second angular range to the reflective targets; and
   a position detection module configured to determine ranges to the reflective targets, the position detection module using the ranges, the first angle, and the second angles to determine a deformation of the surface.

14. The system of claim 13, wherein the first angular range is an elevation angular range, the first angles thereby being elevation.

15. The system of claim 14, wherein the second angular range is an azimuth angular range, the second angles thereby being azimuth angles.

16. The system of claim 13, wherein the position detection module includes a correlation module in communication with the light source module.

17. The system of claim 13, wherein the position detection module includes processing electronics in communication with the one dimensional sensor.

18. The system of claim 13, wherein the system is a space metrology system.

* * * * *